United States Patent
McPhillen et al.

(10) Patent No.: US 9,854,260 B2
(45) Date of Patent: Dec. 26, 2017

(54) KEY FRAME ALIGNED TRANSCODING USING KEY FRAME LIST FILE

(71) Applicant: DISNEY ENTERPRISES, INC., Burbank, CA (US)

(72) Inventors: Jared McPhillen, Glendale, CA (US); Kevin Liao, Rancho Palos Verdes, CA (US); Mark Arana, West Hills, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 830 days.

(21) Appl. No.: 13/787,559

(22) Filed: Mar. 6, 2013

(65) Prior Publication Data

US 2014/0254658 A1    Sep. 11, 2014

(51) Int. Cl.
- H04N 7/26    (2006.01)
- G06F 17/00   (2006.01)
- G06F 15/16   (2006.01)
- H04N 19/40   (2014.01)

(52) U.S. Cl.
CPC .................... *H04N 19/40* (2014.11)

(58) Field of Classification Search
CPC ............. H04N 19/0029; H04N 19/40
USPC ..................................... 375/240.02
See application file for complete search history.

(56) References Cited

U.S. PATENT DOCUMENTS

| | | | |
|---|---|---|---|
| 5,612,900 A * | 3/1997 | Azadegan et al. | 709/247 |
| 6,104,441 A | 8/2000 | Wee et al. | |
| 7,330,509 B2 | 2/2008 | Lu et al. | |
| 7,397,932 B2 | 7/2008 | McAlpine et al. | |
| 7,426,734 B2 | 9/2008 | Debique et al. | |
| 7,599,965 B1 | 10/2009 | Benitez et al. | |
| 7,619,645 B2 | 11/2009 | Cockerton | |
| 7,624,337 B2 | 11/2009 | Sull et al. | |
| 7,823,055 B2 | 10/2010 | Sull et al. | |
| 8,098,730 B2 | 1/2012 | Ma et al. | |
| 8,214,741 B2 | 7/2012 | Errico et al. | |
| 2002/0152317 A1 * | 10/2002 | Wang et al. | 709/231 |
| 2002/0186769 A1 | 12/2002 | O'Brien | |
| 2005/0094562 A1 | 5/2005 | Roy et al. | |
| 2007/0033515 A1 | 2/2007 | Sull et al. | |
| 2010/0268836 A1 | 10/2010 | Jabri et al. | |
| 2012/0179833 A1 | 7/2012 | Kenrick et al. | |
| 2013/0268688 A1 * | 10/2013 | Galanes et al. | 709/231 |

OTHER PUBLICATIONS

Shan Liu et al., "MPEG video transcoding with joint temporal-spatial rate control", Proceedings of the SPIE—The International Society for Optical Engineering, 2002, pp. 278-289, vol. 4790, SPIE—Int. Soc. Opt. Eng., USA.

(Continued)

*Primary Examiner* — Hee-Yong Kim
(74) *Attorney, Agent, or Firm* — Sheppard, Mullin, Richter & Hampton LLP (57) ABSTRACT

Systems and methods are provided for transcoding a set of key frame aligned output files from a source file. A key frame list file is generated while transcoding a first output file of the set. Subsequent output files of the set may be created non-sequentially and in parallel using the key frame list file.

18 Claims, 7 Drawing Sheets

(56) References Cited

OTHER PUBLICATIONS

Lau, Phooi Yee et al., "Content-sensitive approach for video browsing and retrieval in the context of video delivery: VBaR framework", Informatica, Sep. 1, 2011, pp. 1-15, vol. 35 n. 3.
Y-Hsuan Ho et al., "A Rate-Constrained Key-Frame Extraction Scheme for Channel-Aware Video Streaming", International Conference on Image Processing, 2004, pp. 613-116.
U.S. Appl. No. 13/787,458 electronically filed Mar. 6, 2013.

* cited by examiner

|   | Output Frame Size (width x height) | Output Bitrate (quality) in Kilobits/sec |
|---|---|---|
| 1 | 1920x1080 | 8000 |
| 2 | 1920x1080 | 4000 |
| 3 | 1920x1080 | 3500 |
| 4 | 1920x1080 | 2000 |
| 5 | 1280x720 | 1500 |
| 6 | 1280x720 | 1400 |
| 7 | 852x480 | 1250 |

Fig. 3

```
#options: 854x480 fps=25/1 timebase=1/25 bitdepth=8 cabac=1 ref=11 deblock=1:1:1
analyse=0x3:0x113 me=umh subme=8 psy=1 psy_rd=1.00:0.15 mixed_ref=1
me_range=16 chroma_me=1 trellis=1 8x8dct=1 cqm=0 deadzone=21,11 fast_pskip=1
chroma_qp_offset=-3 threads=6 sliced_threads=0 nr=0 decimate=1 interlaced=0
bluray_compat=0 constrained_intra=0 bframes=5 b_pyramid=2 b_adapt=2 b_bias=0
direct=3 weightb=1 open_gop=0 weightp=2 keyint=24 keyint_min=2 scenecut=1
intra_refresh=0 rc_lookahead=24 rc=2pass mbtree=0 bitrate=1800 ratetol=1.0
qcomp=0.60 qpmin=5 qpmax=35 qpstep=4 cplxblur=20.0 qblur=0.5
vbv_maxrate=1900 vbv_bufsize=1304 nal_hrd=none ip_ratio=1.40 pb_ratio=1.30
aq=1:1.00
```
← 401

```
in:0 out:0 type:I dur:2 cpbdur:2 q:26.93 tex:182662 mv:66285 misc:221 imb:3600
pmb:0 smb:0 d:- ref:;

in:4 out:1 type:P dur:2 cpbdur:2 q:26.27 tex:77315 mv:12702 misc:2431 imb:447
pmb:1049 smb:2104 d:- ref:0 ;

in:2 out:2 type:B dur:2 cpbdur:2 q:27.41 tex:30631 mv:11358 misc:1251 imb:198
pmb:896 smb:2506 d:s ref:0 ;

in:1 out:3 type:b dur:2 cpbdur:2 q:28.54 tex:19299 mv:10053 misc:1352 imb:119
pmb:786 smb:2695 d:s ref:0 ;

in:3 out:4 type:b dur:2 cpbdur:2 q:28.54 tex:12204 mv:5243 misc:1337 imb:31
pmb:516 smb:3053 d:- ref:0 ;

in:7 out:5 type:P dur:2 cpbdur:2 q:27.27 tex:249083 mv:24573 misc:392 imb:3192
pmb:375 smb:33 d:- ref:0 ;

...
```
← 402

```
in:96 out:96 type:I dur:2 cpbdur:2 q:17.28 tex:806615 mv:164123 misc:182 imb:3600
pmb:0 smb:0 d:s ref:;

...
```
← 403

```
in:105 out:105 type:I dur:2 cpbdur:2 q:17.28 tex:806615 mv:164123 misc:182
imb:3600 pmb:0 smb:0 d:s ref:;

...
```
← 404

```
in:201 out:201 type:I dur:2 cpbdur:2 q:17.28 tex:806615 mv:164123 misc:182
imb:3600 pmb:0 smb:0 d:s ref:;

..
```
← 405 in:1434 out:1436 type:b dur:2 cpbdur:2 q:19.92 tex:41115 mv:11131 misc:3514
imb:38 pmb:1810 smb:1752 d:s ref:0 ;

KEY FRAME ALIGNED TRANSCODING USING KEY FRAME LIST FILE

TECHNICAL FIELD

The present disclosure relates generally to digital media encoding, and more particularly, some embodiments relate to systems and methods for producing key frame aligned video files.

DESCRIPTION OF THE RELATED ART

Due to the growing number of digital media distribution platforms that are available, a single piece of media content, such as a movie, is often digitized or transcoded into different formats and bit-rates. In some cases, a set of output files are key frame aligned. For example, such output files may be used in adaptive streaming distribution.

BRIEF SUMMARY

Systems and methods are provided for producing sets of key frame aligned digital media files from a source file. These key frame aligned files may then be used in adaptive video streaming. Adaptive video streaming often uses multiple digital media files having the same content but differing quality levels. Key frame alignment across the set of files allows relatively seamless switching between different files to adapt to changing connection conditions. In some implementations, a key frame list file is generated while transcoding a first output file of the set. Subsequent output files of the set may be created non-sequentially and in parallel using the key frame list file.

Other features and aspects of the disclosure will become apparent from the following detailed description, taken in conjunction with the accompanying drawings, which illustrate, by way of example, the features in accordance with various implementations.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily to scale.

FIG. 4 illustrates an example statistics file produced during a transcoding pass of the method of FIGS. 2A and 2B.

DETAILED DESCRIPTION

A lossy encoding process sacrifices information to compress data. Many digital media encoding techniques follow a common chain of steps: (1) prediction; (2) transformation and quantization; and (3) entropy coding. The output files produced by many such techniques are in the form of a sequence of groups of pictures (GOPs). A GOP comprises a key frame, or intra-frame (I-frame), followed by various inter-frames, such as P-frames, B-frames, or b-frames.

Many content distributors create multiple versions of a single video, song, or other digital media program for multiple avenues of distribution. For example, for a single piece of content, a video distributor might maintain a plurality of different files having the same resolution but different bitrates. These groups of files may be used in web distribution using adaptive variable bitrate streaming techniques. These adaptive streaming techniques typically require key frame alignment across the group of files.

One way of creating key frame aligned output files is to place key frames at predefined intervals. After the interval is defined, the transcoder blindly places key frames at this interval, and only this interval. However, video quality is improved when key frames can be placed at varying locations that do not follow strict interval separation, such as scene changes.

Figure 1:
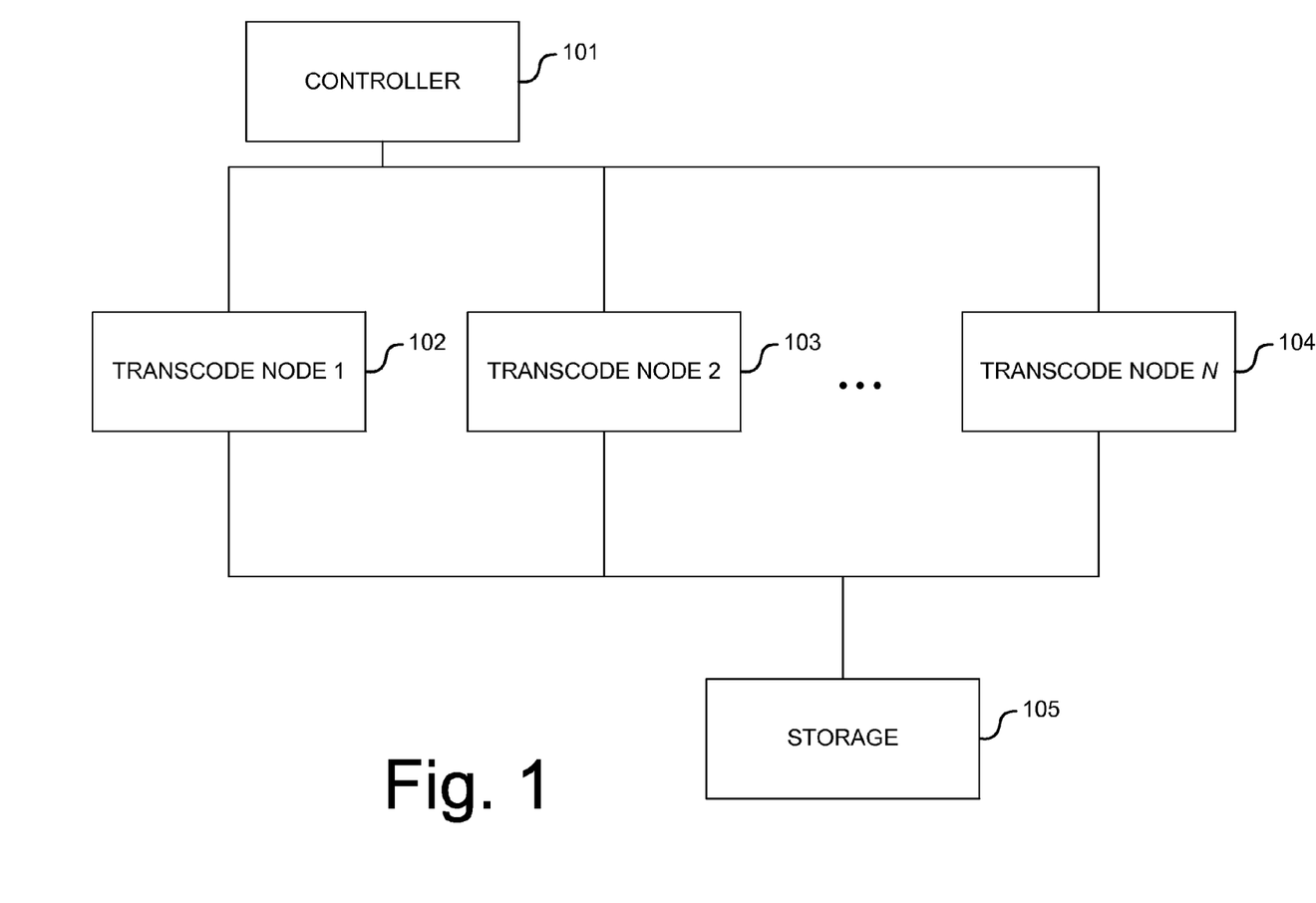
FIG. 1 illustrates an example transcoding system.

FIG. 1 illustrates a transcoding system for production of key frame aligned digital media files from a source file, such as a mezzanine file. The system comprises a controller 101 in communication with a plurality of transcoding nodes 102, 103, 104, and a network storage 105.

The controller maintains records and manages the transcoding processes performed by the transcoding nodes 102, 103, 104. In some implementations, the controller 101 maintains records of where source files are stored on network storage 105 and records of where transcoded files should be stored on network storage 105. The controller 101 may comprise a server or other network attached computer.

The transcoding nodes 102, 103, 104 are a plurality of network attached computers in communication with the controller 101. Each transcoding node 102, 103, or 104 receives transcoding instruction from the controller 101. In accordance with the instructions, the transcoding nodes 102, 103, 104 retrieve a copy of the source file from the storage 105 and transcode the source file to produce an output video file. The transcoding nodes 102, 103, 104, then store the output video file and associated statistics file on the network storage 105.

The network storage 105, may comprise a storage area network, a network attached storage, a server system, or other network storage system. The network storage 105 stores the source file, the output files, associated statistics files, and a key frame list file for the output files.

Figure 2A:
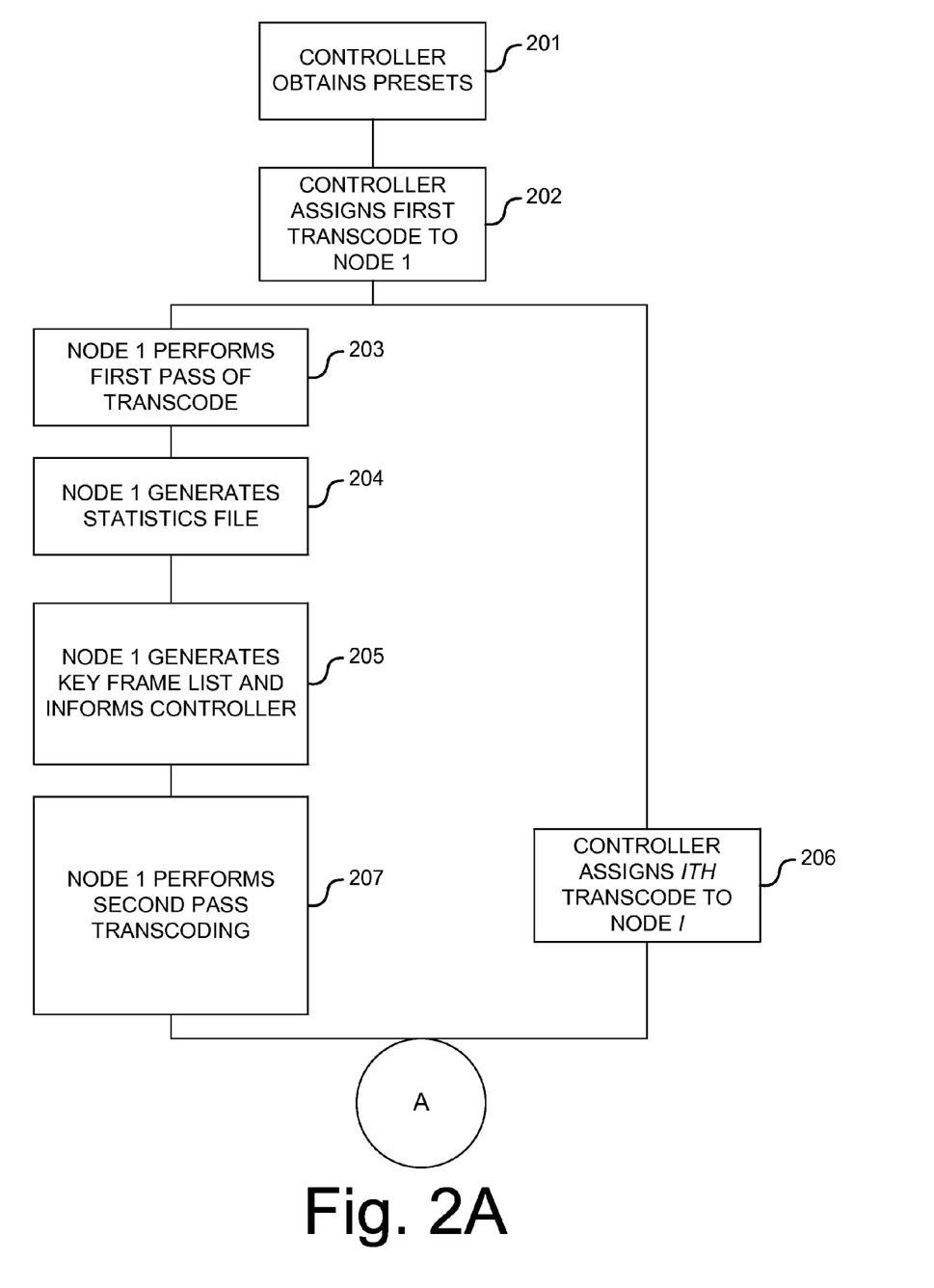
FIGS. 2A and 2B illustrate an example transcoding method that may be implemented using the system of FIG. 1.
Figure 2B:
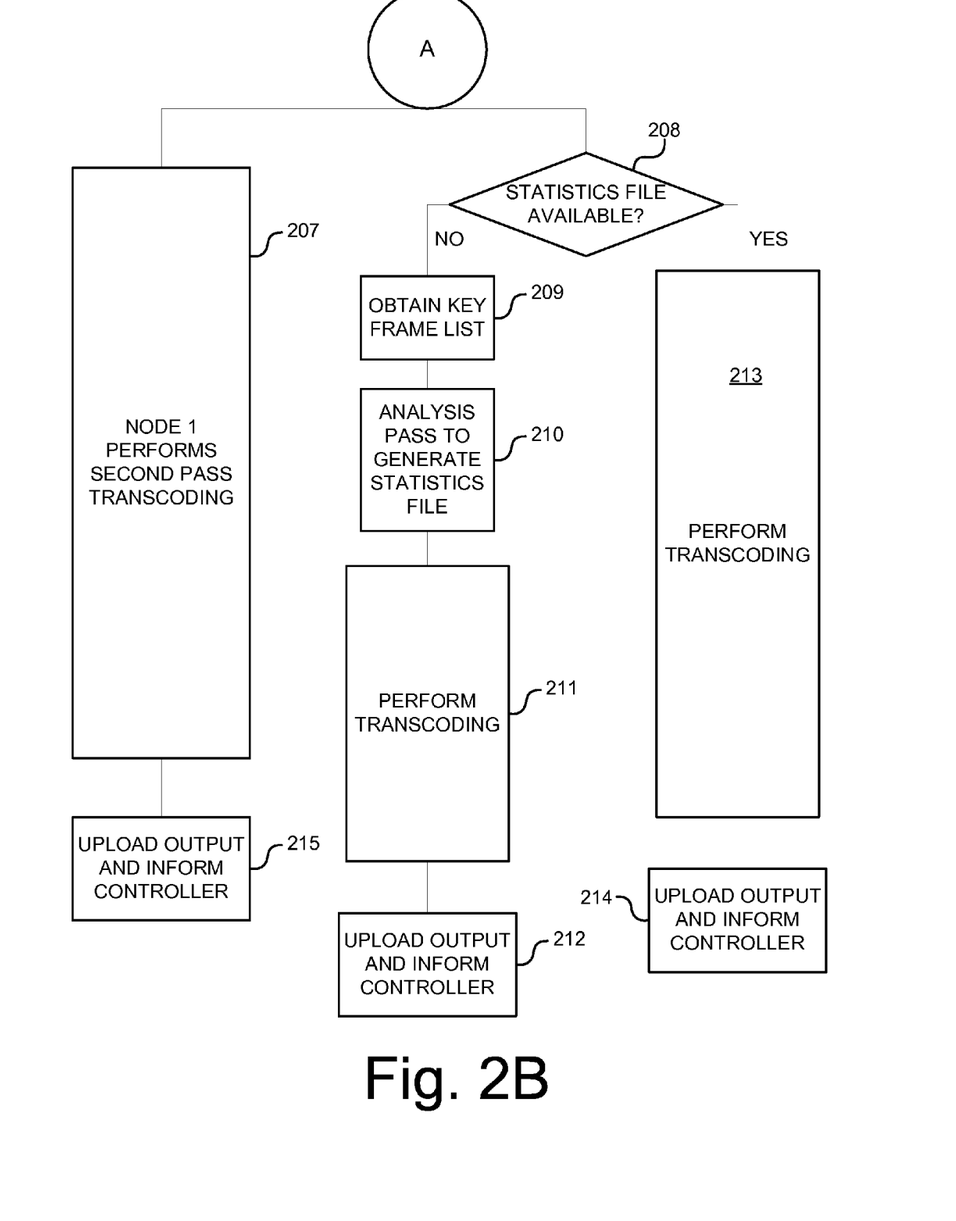

FIGS. 2A and 2B illustrate an example method of producing a set of key frame aligned output files, for example by the transcoding system of FIG. 1. In step 201, the controller 101 obtains and sorts a set of presets for the key frame aligned output files. The presets are defined as a collection of settings, such as compressed video bitrate and output frame size, that define how the transcoder, such as a transcoding node 102, 103, 104 of FIG. 1, processes the source file to produce the corresponding output files. In some implementations, the presets may be obtained from a system user, from a storage location, or by being generated by the controller 101. If the presets are unordered, in step 201, the controller 101 sorts the presets, first by frame size, and then by bitrate.

Figure 3:
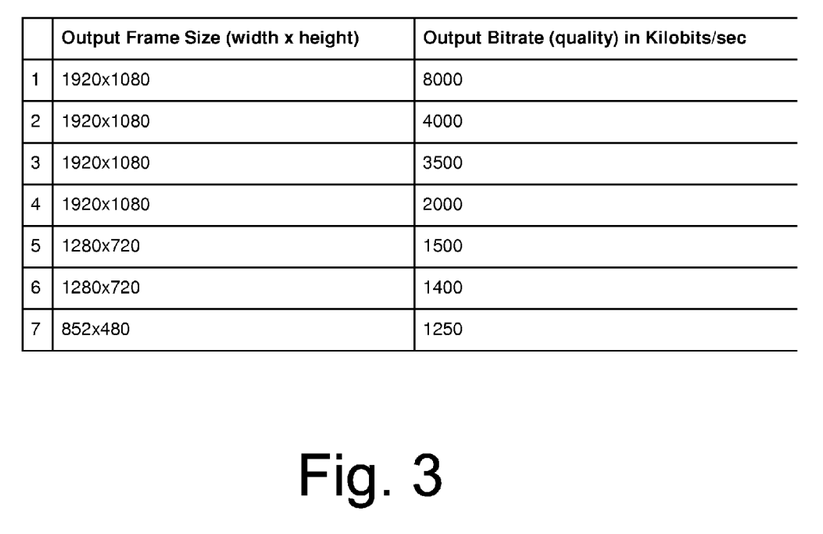
FIG. 3 illustrates an example of output file presets for a set of key frame aligned transcoded files that may be produced by the method of FIGS. 2A and 2B.

FIG. 3 illustrates an example table of presets sorted by frame size and bitrate. Presets 1-4 designate output files having a frame size of 1920×1080, with bitrates of 8000 Kb/s, 4000 Kb/s, 3500 Kb/s, and 2000 Kb/s, respectively. Presets 5 and 6 designate output files having a frame size of 1280×720, with bitrates of 1500 Kb/s and 1400 Kb/s. Preset 7 designates an output file having a frame size of 852×480 and a bitrate of 1250 Kb/s. In various implementations, greater or fewer numbers of presets may be employed, along with various combinations of frame sizes and bitrates.

In step 202 of FIG. 2A, the controller 101 identifies an available transcoder node (Node 1) and assigns the node to transcode the source file to produce the first output file. In some implementations, the controller 101 transmits a JavaScript Object Notation (JSON) based instruction over the network to Node 1. The JSON based instruction may contain an instruction to transcode the preset according to the preset frame size and bitrate. The instruction may also include information on where the source file is stored, and where to upload output files such as the output transcode, statistics files, and key frame list files.

In step 203, Node 1 receives the message from the controller 101, parses the message and encodes the file specified in the instruction using the preset parameters. During step 203, Node 1 performs a first pass of a transcoding step to generate a statistics file 204 (stats file). An example of a transcoding statistics file (stats file) is shown in FIG. 4. Such stats files may be output by transcoders, such as H.264 compliant coders like the x264 transcoder.

Stats files detail various parameters that were used when transcoding a file and may be used by transcoders in future encoding passes. For example, a two-pass transcoding procedure may comprise an analysis pass and an encoding pass. In the analysis pass, a source video is analyzed by the transcoder to produce a preliminary stats file. The preliminary stats file is then used in the encoding pass to produce a transcoded file. During the encoding pass, the stats file is also updated according to various decisions made by the transcoder during the second encoding pass. Transcoding procedures may also implement multiple encoding passes. In each subsequent encoding pass, the stats file from the previous encoding pass is used as an input and updated according to various decisions made during the subsequent encoding pass. The stats file comprises a list of options 401 that are used to set various transcoding parameters. The stats file further comprises parameters that are used to encode each frame of the video. The parameters may include input and output frame number, frame type, bit allocations for the frame, motion vectors, and residuals, and other transcoding parameters. Groups 402, 403, 404, and 405 are groups of parameters for a sequence of GOPs of the video.

Returning to FIG. 2A, after Node 1 generates the stats file in step 204, Node 1 uses the stats file to generate 205 a key frame list file. The key frame list file comprises a listing by frame of each key frame in the stats file. The key frame list file maintains the same number of frames between each key frame as the stats file from which it is derived.

Figure 5:
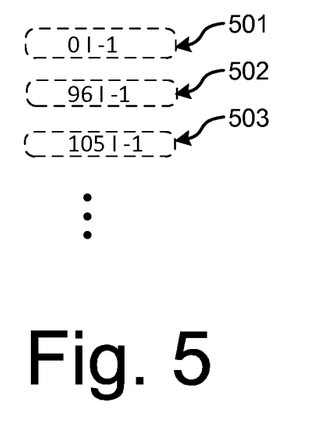
FIG. 5 illustrates an example key frame listing file produced and used during the method of FIGS. 2A and 2B.

FIG. 5 illustrates an example key frame list file derived from the stats file of FIG. 4. The key frame file is generated by using the stats file to make a list by frame number of each key frame (I-frame) of the first output file. In this example, each entry 501, 502, 503 includes the frame number, frame type (here, 'I'), and a quality parameter (QP). In this particular example, the QP value '−1' indicates that the transcoder should decide what QP to use for transcoding the frame.

Returning to FIG. 2A, in step 205, after generating the key frame list file, Node 1 informs the controller 101 that the key frame list file has been created. In some implementations, Node 1 also uploads the key frame list file to a network storage, such as network storage 105 in FIG. 1, at a location determined by the controller 101 (for example, in the original transcode instruction message). In further implementations, Node 1 also uploads the stats file to the network storage 105 at a location determined by the controller 101. In these implementations, Node 1 may upload the stats file to the network storage 105 as part of step 204. Node 1 may also upload the updated stats file as part of step 207.

When using multi-pass encoding, in step 207, Node 1 begins the second pass of the transcoding procedure using the stats file generated 204 during the first pass.

In parallel, the controller 101 identifies further available nodes and transmits 206 transcode instructions to the available nodes. Similar to the first instruction, the instructions may be transmitted in a JSON-formatted to the network connected transcoding nodes. The instructions may include a location of the source file and locations to store transcoded output files.

Moving to FIG. 2B, in step 215, after the first node finishes the transcode, it uploads the output file and informs the controller 101. The location for the output file may be indicated in the original transcode instruction message transmitted in step 202.

Additionally, each transcoding node determines 208 if a stats file is available for use in transcoding the source file at the assigned preset values. For example, a stats file for the preset might be available if the source file had been previously transcoded at the preset value, or if a transcoder performed a first pass but was interrupted during a second pass. In some implementations, the step of determining 208 if the stats file is available may comprise inspecting the network storage 105 at a predetermined location. For instance, the predetermined location may be included in the transcoding instruction received from the controller 101.

If the stats file for the preset values is not available, then the transcoder node obtains 209 the key frame list file. For example, the key frame list file may be obtained from a predetermined location on the network storage 105. In some instances, the predetermined location for the key frame list file is the same as that for the possible stats file. In other instances, the key frame list file is stored at a different location than the possible stats file.

After obtaining 209 the key frame list file, the transcoding node using the key frame list file to transcode the source file according to its assigned preset. The key frame list file is used to ensure that the output transcoded video file has the same key frame locations as the first transcoded video file that was used to create the key frame list file. In some implementations, the key frame list file is used 210 in an analysis pass to generate a stats file for the transcoded video file. The analysis pass may comprise a first encoding pass of the source file using the key frame list file as an input to ensure that key frames are placed at the proper locations. The output of this analysis pass is a stats file that may be used in subsequent transcoding passes.

After the analysis pass 201, the transcoder transcodes the source file 211 to produce an output transcoded file. In some implementations, the transcoding process 211 includes at least two passes, a first pass using the stats file generated by step 210, and a second pass using the stats file generated by the first pass.

The node then uploads 212 the output transcoded file and updated stats file to the network storage 105. The node further informs 212 the controller 101 that its assigned transcode has been completed.

If the stats file is available 208, then the transcoding node performs 213 a second (or later) pass transcode of the source file using the stats file. When the node uses the stats file to transcode 213, the output transcoded video file has key frames at the locations indicated by the stats file. Since the stats file was originally created by the original node, or by a node using the key frame list file, the transcoded file has the same key frame locations as the other output files in the preset tables. Accordingly, key frame alignment is maintained across the set of output transcoded files. The node then uploads 214 the output transcoded file and updated stats file to the network storage 105. The node further informs 214 the controller 101 that its assigned transcode has been completed.

In summary, after the first pass transcode in step 203, all subsequent transcodes use one of: a stats file derived from the first stats file of the first transcoded file; the key frame list file; or a stats file derived from transcoding a file using the key frame list file. Thus, each output video has key frames at the same location. As illustrated, each node's operations may be performed in parallel. Accordingly, the entire set of key frame aligned output files may be created at the preset values in parallel and non-sequentially.

Where components or modules are implemented in whole or in part using software, in one embodiment, these software elements can be implemented to operate with a computing or processing module capable of carrying out the functionality described with respect thereto. After reading this description, it will become apparent to a person skilled in the relevant art how to implement the disclosure using other computing modules or architectures.

Figure 6:
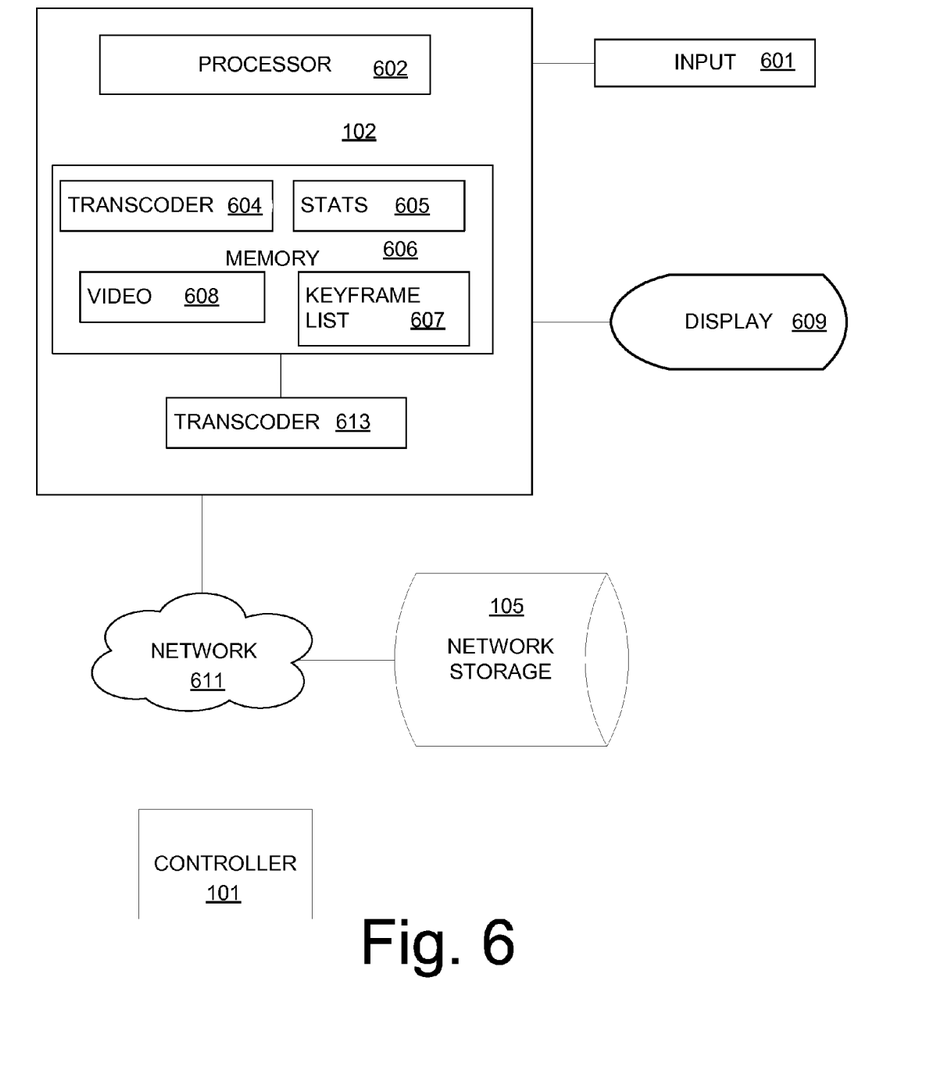
FIG. 6 illustrates an example transcoding node and associated system devices of the system of FIG. 1.

FIG. 6 presents an exemplary diagram of transcoding node in a transcoding system as illustrated in FIG. 1. The system includes a transcoding node 102, display 609, input device 601, network 611, controller 101, and network storage 105. In this implementation, the transcoding node 102 comprises a computer workstation. Transcoding node 102 includes processor 602, memory 606, and, optionally, hardware transcoder 613. In addition to memory 606, the transcoding node 102 may include other non-transitory computer readable media, such as non-volatile storage devices. Various data elements and programs may be stored in memory 606. For example, the transcoding program 604 may be stored and executed from memory 606. Data that is used by the transcoding program 604 may also be stored in memory 606. As described above, such data may include digital media files 608 and associated stats file 605. In some cases, all digital media files 608 that will be used by transcoding program 604 are stored in memory 606. In other cases, the files 608, 605 are a subset of the files to be processed. Other files may be provided to the transcoding node 102 over the network 611 or may be stored in local non-volatile storage.

Transcoding node 102 may comprise any computing device such as a rackmount server, desktop computer, or mobile computer. A system user may utilize input device 601, for example a keyboard and mouse, to direct the operation of transcoding program 604 executing from memory 606 by processor 602. Additionally, aspects of the transcoding program may be executed by a GPU or a hardware transcoder 613. In some implementations, the files 608, 605 may be received over network 611 from network storage 105 or controller 101. Alternatively, some or all of the files 608, 605 may be generated in the transcoding node 102. Network 611 may be a high speed network suitable for high performance computing (HPC), for example a 10 GigE network or an InfiniBand network.

While various implementations have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present application. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method of transcoding a video file, comprising:
   obtaining a source file;
   transcoding the source file to produce a first output file and a first statistics file;
   parsing the first statistics file to produce a key frame listing file for the first output file; and
   transcoding the source file using the key frame listing file to produce a second output file that is key frame aligned with the first output file.

2. The method of claim 1, further comprising:
   transcoding the source file using the key frame listing file to produce a third output file that is key frame aligned with the first output file.

3. The method of claim 2, wherein the step of transcoding to produce the second output file and the step of transcoding to produce the third output file are performed in parallel.

4. The method of claim 2, wherein the step of transcoding to produce the second output file and the step of transcoding to produce the third output file are performed at separate transcoding nodes.

5. The method of claim 1, further comprising:
   determining if a second statistics file is available for a preset bitrate and frame size of a third output file;
   if the second statistics file is available, transcoding the source file using the second statistics file to produce the third output file.

6. The method of claim 5, further comprising:
   if the second statistics file is not available, transcoding the source file using the key frame listing file to produce the third output file.

7. The method of claim 1, wherein the step of transcoding the source file using the key frame listing file comprises performing an analysis pass to generate a second statistics file for the second output file.

8. The method of claim 1, further comprising:
   transmitting a message to a controller indicating that the key frame listing file has been produced.

9. The method of claim 1, further comprising:
   storing the key frame listing file at a location on a network storage.

10. A method, comprising:
    obtaining a source file;
    obtaining an instruction to transcode the source file to produce an output file having a frame size and a bitrate;
    obtaining a key frame listing file for the output file;
    transcoding the source file using the key frame listing file to produce the output file.

11. The method of claim 10, further comprising:
    determining if a statistics file for the frame size and the bitrate is available;
    if the statistics file is available, transcoding the source file using the statistics file to produce the output file;
    if the statistics file is not available, obtaining the key frame listing file and transcoding the source file using the key frame listing file to produce the output file.

12. The method of claim 11, wherein the step of determining if a statistics file is available comprises looking at a predetermined location on a network storage to determine if the statistics file is stored at the predetermined location.

13. The method of claim 12, wherein the predetermined location is included in the instruction.

14. The method of claim 10, wherein the step of transcoding the source file using the key frame listing file comprises performing an analysis pass to generate a second statistics file for the second output file.

15. A method comprising:
    obtaining a source file;
    obtaining an instruction to transcode the source file to produce an output file;
    transcoding the source file to produce the output file and a statistics file for the output file;
    parsing the statistics file to produce a key frame listing file; and
    storing the key frame listing file.

16. A transcoding system, comprising:
    a controller;
    a network storage in communication with the controller; and
    a plurality of transcoding nodes in communication with the controller and the network storage;
    wherein the controller is configured to:
       identify a source file on the network storage;
       determine a plurality of frame size and bitrate presets for a plurality of output files transcoded from the source file;
       transmit a transcoding instruction to a transcoding node of the plurality of transcoding nodes; and
    wherein the transcoding node of the plurality of transcoding nodes is configured to:
       receive the transcoding instruction;
       transcode the source file to produce a first output file of the plurality of output files, a first statistics file, and a key frame listing file; and
       upload the first statistics file, and the key frame listing file to the network storage.

17. The transcoding system of claim 16, wherein a second transcoding node of the plurality of transcoding nodes is configured to:
    receive a second transcoding instruction from the controller to transcode the source file at a second preset frame size and bitrate to produce a second output file;
    determine if a second statistics file for the second preset is available;
    if the second statistics file is available, transcode the source file using the second statistics file to produce the second output file;
    if the second statistics file is not available, transcode the source file using the key frame listing file to produce the second output file.

18. The transcoding system of claim 17, wherein the step of the second transcoding node transcoding the source file using the key frame listing file comprises the second transcoding node performing an analysis transcoding pass on the source file using the key frame listing file to produce the second statistics file.

* * * * *